H. E. JOHNSON.
TRUCK.
APPLICATION FILED NOV. 1, 1912.
1,091,516. Patented Mar. 31, 1914.
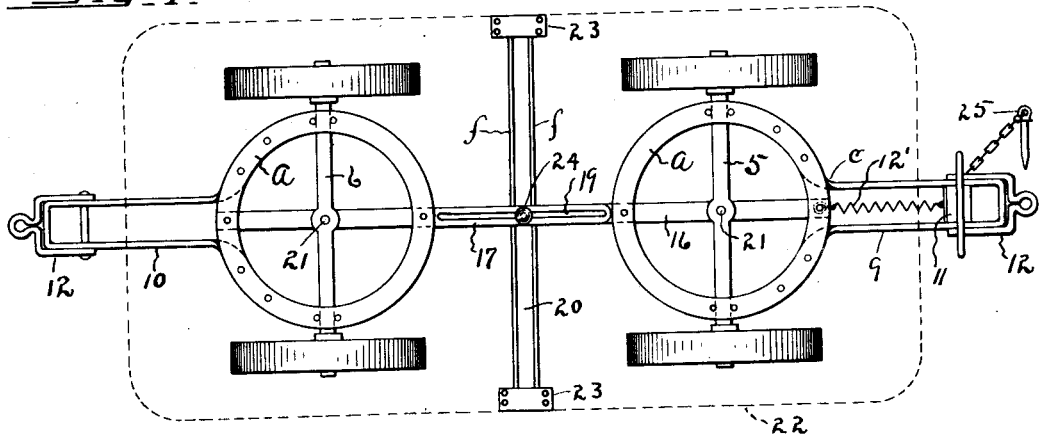
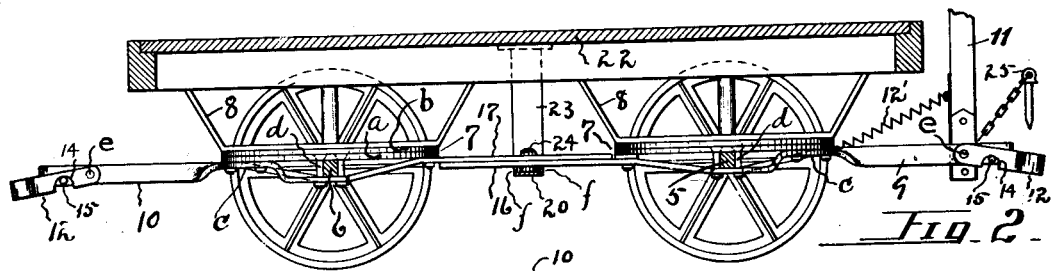
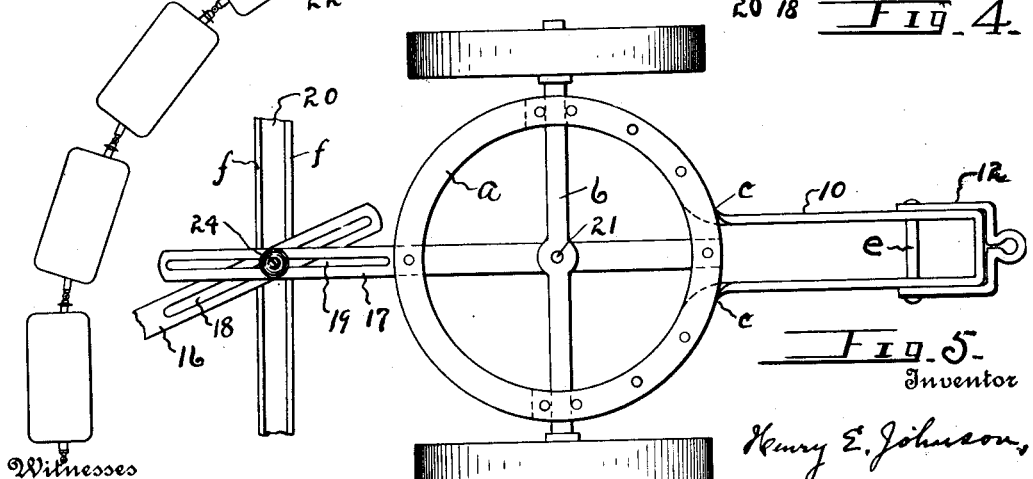

UNITED STATES PATENT OFFICE.

HENRY E. JOHNSON, OF OMAHA, NEBRASKA.

TRUCK.

1,091,516.  Specification of Letters Patent. Patented Mar. 31, 1914.

Application filed November 1, 1912. Serial No. 729,079.

*To all whom it may concern:*

Be it known that I, HENRY E. JOHNSON, a citizen of the United States, residing at Omaha, in the county of Douglas and State of Nebraska, have invented certain new and useful Improvements in Trucks, of which the following is a specification.

This invention relates to an improvement in trucks, and has for its principal object to provide a control of their movements when describing curves; the means for said control to consist of simple devices which may be economically constructed and may be conveniently applied to the trucks.

In the handling of freight by use of hand trucks it is often desirable that several of them may be connected in tandem order or end to end, to be drawn upon curves; and it is important that all of the trucks thus connected may move substantially in the same curved line or circle traversed by the foremost truck controlled by an operator. As trucks are ordinarily constructed, those at the rear will move nearer to the center of the circle than the foremost truck, when they are connected end to end and an attempt is made to move them upon regular curves, for the reason that the angle of the front and rear axle of each truck, to the longitudinal axis of the truck, will not be uniform. By employing the herein described trucks, an operator, by use of the tongue, may cause the foremost one to move upon any desired curve or curves, and the other trucks, connected and drawn therewith, will all describe the same curves; and this is of great advantage, since it is desirable and often necessary to move around obstructions in narrow, sinuous passageways in the operation of handling or moving freight. The invention also has reference to a convenient means for connecting the trucks, and to the mountings of the tongues.

With these objects in view and others to be mentioned, the invention consists of the novel construction, combination and arrangement of parts as described herein and claimed, and as illustrated in the accompanying drawing, wherein,—

Figure 1 is a plan view showing the lower parts of a truck, the relative position or outline of the platform being indicated by broken lines. Fig. 2 is a side view of the truck, the platform being in section. Fig. 3 is a plan view, showing several trucks disposed end to end and connected. Fig. 4 is an enlarged detail showing a part of a guide in longitudinal section, the connected reaches being in transverse section. Fig. 5 is an enlarged, broken view, being a detail relating to Fig. 1, to clearly show a part of a guide and the connected reaches.

Referring now to the drawing for a more particular description, numeral 5 indicates the front axle and 6 the rear axle of a truck, and upon the upper side of each axle is disposed and suitably secured the horizontal, lower member $a$ of a fifth wheel 7, the upper member $b$ of each fifth wheel being seated upon the lower member $a$ and rigidly secured to the platform by means of brackets 8.

At 9 and 10 are indicated, respectively, the front hounds and rear hounds of the truck, each being substantially of U-shape, and having curved end-portions $c$ conforming to the curvature of and adapted to be secured upon the lower face of the lower member $a$ of a fifth wheel, its terminals being secured upon the axle by means of bolts $d$; and by means of said bolts, members $a$ are rigidly secured to the axle.

Pivotally mounted between the parallel arms of the front hounds, by means of one of bolts $e$ is a tongue 11 which is normally sustained in an upright position by means of a spring 12'; and at 12 are indicated clevis-members which project outwardly from the front and rear hounds, their mountings being upon bolts $e$. The clevis-members are provided, between their ends, with transverse slots 14 which open upon their lower sides or edges, and at 15 are indicated lugs or stops which project outwardly from the sides of the hounds. Each clevis is free to be swung upwardly, and it may be swung downwardly until the upper wall of its slot 14 engages a lug 15 as shown in Fig. 2, so that, while in these inclined positions, the adjacent clevises of two trucks may be conveniently connected when it is desired to move several trucks arranged as a train.

At 16 and 17 are indicated levers, links or reach-members. The reach-member 16 is disposed at right angles to the front axle 5; it is formed with a longitudinal slot 18 (Fig. 5.) and has a part which extends below the axle 5 to be rigidly secured by any suitable means to the lower member $a$. The lever or reach 17 has a part disposed below the rear axle 6 to be rigidly secured to the lower member a thereof. It is formed with a longitudinal slot 19, and is disposed at right angles to said rear axle.

At 20 is indicated a horizontal guide or trackway, having parallel, upset edges or flanges f. It is disposed midway between bolt-apertures 21 of the fifth wheels, transversely of the platform 22 and suitably secured at its ends to the platform by means of hangers or brackets 23. Disposed in slots 18 and 19 of the reaches and engaging in the trackway 20, is lug, pivot-pin or rider 24.

Any suitable king-bolts (not shown) may be employed and seated in apertures 21 for connecting the members a and b of each fifth wheel at their centers, so that these members may swing in opposite directions; and an operator, by use of the tongue 11 may manually control the swinging movements of the front axle.

During operation, when the front axle is disposed at right angles to the longitudinal axis of the truck, the movement of said truck, of course, will be in a straight line; and when it is desired to move it upon a curve, the operator, by use of the pole or tongue 11, may change the angle of the axle 5, and this change will cause the reach 16 to swing horizontally and transversely of the truck. The swinging movement of reach 16 will cause a swinging movement of reach 17, since the lug 24 engages the trackway 20 and engages within the slots of the reaches; and on account of the arrangement of the parts mentioned, while the rear axle will be swung reversely to the movement of the front axle, both of the axles will be maintained at an equal angle, lug 24 sliding in the trackway 20, the reaches being supported by said trackway, the slots 18 and 19 being engaged by the lug and permitting longitudinal sliding movements of the reaches with reference to the connecting-lug, while the axles are performing their swinging movements. It will thus be seen that the angle of movement of one axle may be controlled by the movement of the other axle; and by reason of the construction, the angles in which the axles of a truck are disposed, with reference to the longitudinal axis of the truck or the transverse trackway 20, are always equal. Since the tongues 11 are supported in an upright position by means of springs 12', they will not be obtrusive when several of these trucks are connected end to end as shown in Fig. 3. When disposed in this manner to form a train, the clevis at the end of one truck may be swung upwardly to lie upon the clevis of an adjacent truck, and may be connected by a pin 25.

In practice, for drawing a train of these trucks upon curves, the operator, by use of the tongue of the foremost truck, may have a control to move it upon any desired curve. Since the rear axle of the foremost truck will be swung under control of the front axle, as described, it is obvious that the front axle of the truck which is connected to said rear axle will also be swung, with the result that all of the trucks, thus connected, will move upon the same curve, substantially, as the foremost truck; and this is of great advantage for the handling of freight in warehouses where it is desired to move the train in cross-passageways, as first mentioned.

While the length of trackway 20 is shown to be substantially equal to the width of the platform, and therefore would permit swinging movements of the axles in an arc of forty five degrees, or substantially so, the trackway may have a length considerably less than shown, since a swinging movement for these axles of ten or fifteen degrees is all that is usually required.

Having fully explained my invention, what I claim and desire to secure by Letters Patent is,—

1. A truck comprising, in combination with a body, front and rear axles arranged to have horizontal swinging movement, a transverse trackway of channel form secured to said body between said axles, a lever rigid with and projecting rearwardly from the front axle, a lever rigid with and projecting forwardly from the rear axle, said levers having overlapping ends having elongated slots formed directly therein, a pivot member traversing the slots of both of said levers and engaging in and being guided by said trackway, and a tongue for shifting said front axle.

2. A truck, comprising in combination with a body, front, and rear axles, arranged to have horizontal swinging movement, a transverse trackway of U-shape in cross section secured to said body between said axles, a lever rigid with and projecting rearwardly from the front axle, a lever rigid with and projecting forwardly from the rear axle, said levers having overlapping ends which overlie and rest upon said trackway and have elongated slots formed longitudinally therein, and a pivot member traversing the slots of both levers and depending into and being guided by said trackway.

In testimony whereof I have affixed my signature in presence of two witnesses.

HENRY E. JOHNSON.

Witnesses:
L. M. THOMAS,
HIRAM A. STURGES.